United States Patent
Shih et al.

(10) Patent No.: US 9,028,673 B2
(45) Date of Patent: May 12, 2015

(54) PRODUCTION OF LOW CLOUD POINT DISTILLATES

(71) Applicant: ExxonMobil Research and Engineering Company, Annandale, NJ (US)

(72) Inventors: Stuart S. Shih, Gainesville, VA (US); Berne K. Stober, Esmont, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 180 days.

(21) Appl. No.: 13/668,439

(22) Filed: Nov. 5, 2012

(65) Prior Publication Data

US 2013/0112594 A1   May 9, 2013

Related U.S. Application Data

(60) Provisional application No. 61/557,530, filed on Nov. 9, 2011.

(51) Int. Cl.
*C10G 65/02* (2006.01)
*C10G 65/12* (2006.01)
(Continued)

(52) U.S. Cl.
CPC ............... *C10G 65/12* (2013.01); *C10G 65/10* (2013.01); *C10G 45/60* (2013.01); *C10G 65/043* (2013.01);
(Continued)

(58) Field of Classification Search
CPC ............ C10G 2300/202; C10G 2300/304; C10G 2300/4006; C10G 2300/4012; C10G 2300/4018; C10G 2400/02; C10G 2400/04; C10G 2400/08; C10G 45/60; C10G 65/043; C10G 65/02; C10G 65/04; C10G 65/12; C10G 1/08

USPC ........................ 208/49, 57, 89, 133, 141, 209
See application file for complete search history.

(56) References Cited

U.S. PATENT DOCUMENTS 3,412,016 A   11/1968   Graven
3,431,194 A   3/1969   Bartok et al.
(Continued)

FOREIGN PATENT DOCUMENTS

EP   0819752 B1   1/1998
WO   2006088314 A1   8/2006

OTHER PUBLICATIONS

The International Search Report and Written Opinion of PCT/US2012/063641 dated Feb. 12, 2013.

*Primary Examiner* — Walter D Griffin
*Assistant Examiner* — Derek Mueller
(74) *Attorney, Agent, or Firm* — Bruce M. Bordelon; Chad A. Guice

(57) ABSTRACT

Systems and methods are provided for producing at least one low sulfur distillate fuel product with improved low temperature properties. A potential distillate fuel feed is initially hydrotreated to reduce sulfur and nitrogen levels in the feed to desired amounts. The hydrotreated effluent is then fractionated to form several fractions, including a light diesel/distillate fraction and a heavy diesel fraction. The heavy diesel fraction is then dewaxed to improve the cold flow properties of the heavy diesel fraction. The dewaxed heavy diesel fraction can be combined with the light diesel fraction, or the dewaxed heavy diesel fraction can be fractionated as well. Optionally, the heavy diesel fraction is dewaxed under conditions effective for producing a dewaxed fraction with a cloud point that is less than or equal to the cloud point of the light diesel/distillate fraction.

20 Claims, 6 Drawing Sheets

(51) Int. Cl.
  *C10L 1/08* (2006.01)
  *C10G 65/10* (2006.01)
  *C10G 45/60* (2006.01)
  *C10G 65/04* (2006.01)
  *B01D 3/14* (2006.01)
(52) U.S. Cl.
  CPC ............... *C10L 1/08* (2013.01); *C10G 2400/04* (2013.01); *C10G 2300/304* (2013.01); *C10G 2300/4018* (2013.01); *C10G 2300/202* (2013.01); *C10G 2300/4006* (2013.01); *C10G 2300/4012* (2013.01); *C10G 2400/02* (2013.01); *C10G 2400/08* (2013.01); *B01D 3/141* (2013.01)

(56) References Cited

U.S. PATENT DOCUMENTS

| | | |
|---|---|---|
| 6,261,441 B1 | 7/2001 | Gentry et al. |
| 2004/0159582 A1 | 8/2004 | Simmons et al. |
| 2011/0132803 A1 | 6/2011 | Umansky et al. |
| 2011/0259793 A1 | 10/2011 | Umansky et al. |

PRODUCTION OF LOW CLOUD POINT DISTILLATES

CROSS-REFERENCE TO RELATED APPLICATIONS

This application claims priority to U.S. Provisional Ser. No. 61/557,530 filed Nov. 9, 2011, herein incorporated by reference in its entirety.

FIELD OF THE INVENTION

This invention provides methods for multi-stage hydroprocessing to form low cloud point distillates.

BACKGROUND OF THE INVENTION

The equipment necessary for refining operations is one of the major sources of costs in a refinery. The equipment can include catalytic reactors, fractionators and/or separators, and other supporting equipment. In a conventional process train, each catalytic reactor can have a dedicated fractionator or separator associated with the reactor, to separate out the various products produced in the catalytic reaction stage.

In diesel hydroprocessing, it is sometimes beneficial to include a dewaxing stage as part of reaction train in order to improve properties of the resulting diesel fuel such as pour point or cloud point. For feeds with suitably low levels of sulfur and/or nitrogen, the dewaxing stage can be included as part of a reactor that contains a hydrotreating stage. Feeds with higher levels of sulfur and/or nitrogen, however, may benefit from having a separate reactor for the dewaxing stage. This leads to a further increase in the capital costs necessary for generating a diesel fuel product.

U.S. Pat. No. 3,431,194 describes a process for lowering the pour point of a middle distillate feed. The middle distillate is split into a lower boiling fraction and a higher boiling fraction. The higher boiling fraction is hydroisomerized to reduce the cloud point and pour point of the higher boiling fraction. The higher boiling fraction is then recombined with the lower boiling fraction to form a middle distillate with improved pour point and cloud point relative to the original feed. Based on the examples, it appears that the cut point for the lower boiling fraction is selected so that the cloud point of the lower fraction is lower than the cloud point for the hydroisomerized higher boiling fraction.

U.S. Pat. No. 3,412,016 shows an example of a fractionator that includes multiple volumes. In U.S. Pat. No. 3,412,016, two independent refinery gasoline streams (such as a low octane and a high octane gasoline) are fractionated in the fractionator. The outputs from the fractionator are a light fraction and distinct heavy fractions from the two separate volumes in the fractionator. In the fractionator, the lighter portions of the two gasoline fractions are allowed to mix.

European patent publication EP 0819752 appears to provide another example of using a fractionator having multiple volumes. In EP 0819752, it appears that two separate input streams are provided to the fractionator. The vapor portions produced in each side of the fractionator are allowed to mix, leading to production of one or more light product fractions from the fractionator. Each side of the fractionator also produces a bottoms portion. In some figures, the bottom portions appear to remain separated after leaving the fractionator, while in other figures, the input to the second side of the fractionator includes portions of the bottoms from both sides of the fractionator.

U.S. Published Patent Application 2011/0132803 describes a two-stage hydroprocessing system that includes a divided wall column fractionator. Methods are described for using the hydroprocessing system to generate a plurality of distillate boiling range products from the divided volumes in the fractionator. Additionally, a naphtha and/or a kerosene product are generated from a common volume at the top of the fractionator.

SUMMARY OF THE INVENTION

In an embodiment, a method for producing distillate products is provided. The method includes hydrotreating a feedstock under effective hydrotreating conditions; passing at least a portion of the hydrotreated feedstock into a first separate volume of a divided wall fractionator; fractionating the at least a portion of the hydrotreated feedstock to form a heavy diesel fraction and a first light diesel fraction, the heavy diesel fraction being withdrawn from the first separate volume of the divided wall fractionator; dewaxing the heavy diesel fraction under effective dewaxing conditions to produce a dewaxed heavy diesel fraction having a cloud point of about −10° C. or less; passing the dewaxed heavy diesel fraction into a second separate volume of the divided wall fractionator; and fractionating the dewaxed heavy diesel fraction to form at least a heavy diesel product withdrawn from the second separate volume, the fractionation further producing a second light diesel fraction, wherein the first light diesel fraction and the second light diesel fraction form a combined light diesel fraction that is withdrawn from a common volume of the divided wall fractionator.

In another embodiment, a method for producing distillate products is provided. The method includes hydrotreating a feedstock under effective hydrotreating conditions; fractionating at least a portion of the hydrotreated feedstock to form a heavy diesel fraction and a light diesel fraction; dewaxing the heavy diesel fraction under effective dewaxing conditions to produce a dewaxed heavy diesel fraction having a cloud point of about −10° C. or less; fractionating the dewaxed heavy diesel fraction to form a dewaxed diesel product and at least one of a naphtha fraction or a light ends fraction; and combining at least a portion of the dewaxed diesel product and the light diesel fraction to form a combined diesel product, the combined diesel product having substantially the same cloud point as the dewaxed diesel product and the light diesel fraction.

DETAILED DESCRIPTION OF THE EMBODIMENTS

Overview

Figure 1:
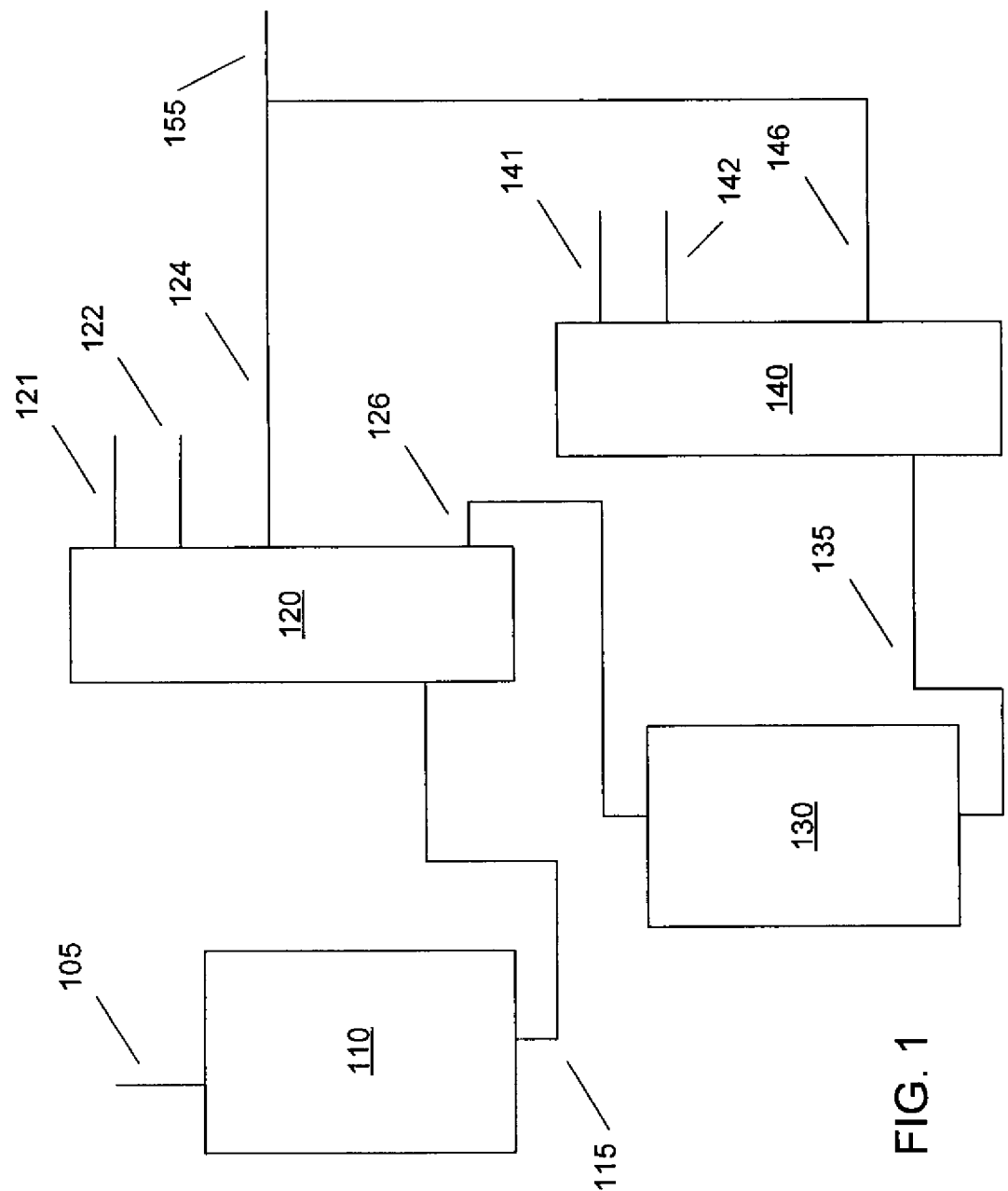
FIG. 1 schematically shows a reaction system for performing a process according to an embodiment of the invention.

In various embodiments, systems and methods are provided for producing at least one low sulfur distillate fuel product with improved low temperature properties. A potential distillate fuel feed is initially hydrotreated to reduce sulfur and nitrogen levels in the feed to desired amounts. In some embodiments, the distillate fuel feed will be a feed with a nitrogen content of at least about 500 ppmw. The hydrotreated effluent is then fractionated to form several fractions, including a light diesel/distillate fraction and a heavy diesel fraction. The heavy diesel fraction is then dewaxed to improve the cold flow properties of the heavy diesel fraction. The dewaxed heavy diesel fraction can be combined with the light diesel fraction, or the dewaxed heavy diesel fraction can be fractionated as well. Preferably, the heavy diesel fraction is dewaxed under conditions effective for producing a dewaxed fraction with a cloud point that is less than or equal to the cloud point of the light diesel/distillate fraction.

In some embodiments, a further advantage may be gained by using a divided wall column fractionator in place of having separate fractionators for each stage of the process. In such embodiments, the effluent from the hydrotreatment stage(s) is passed into a first separate volume of a divided wall fractionator. A height for the dividing wall is selected so that a light diesel fraction is withdrawn from the upper, common volume of the fractionator. One or more heavier fractions, including a heavy diesel fraction, are withdrawn from the first separate volume. Optionally, the heavy diesel fraction can correspond to a bottoms fraction from the first separate volume. At least a portion of the heavy diesel fraction is then passed into a reactor containing one or more dewaxing stages. The effluent from the dewaxing stage(s) is returned to a second separate volume of the divided wall fractionator. Any light diesel (or lighter molecules) generated during dewaxing are again withdrawn from the common volume of the fractionator. A heavy diesel product stream is withdrawn from the second separate volume.

In a preferred embodiment where a divided wall column fractionator is used, the light diesel fraction is withdrawn from the common volume of the fractionator. This means that the light diesel fraction includes molecules that have passed only through the hydrotreating stage as well as molecules that have passed through the dewaxing stage. For the molecules that have passed through the dewaxing stage and are included in the light diesel fraction, at least a portion of the molecules will correspond to molecules that boiled below the light diesel cut point due to isomerization. For example, one option for the light diesel versus heavy diesel cut point is about 285° C. The boiling point for n-hexadecane ($C_{16}H_{34}$, also referred to as cetane) is about 287° C. In the hydrotreating effluent, most of the n-hexadecane would be expected to form part of the heavy diesel fraction if the cut point is 285° C. After dewaxing, some of the n-hexadecane molecules will isomerize to form alkanes with one or more methyl side groups, such as 2,3-dimethyl tetradecane. Such a compound would be expected to have a boiling point somewhere between 260° C. and 280° C., and therefore would be expected to form part of the light diesel fraction.

The addition of isomerized. molecules to the light diesel fraction is valuable for the cetane rating of the light fraction. Cetane rating generally increases with molecular weight for a given type of compound. However, increasing the branching for compounds with similar numbers of carbon atoms tends to reduce the cetane rating of a compound. The compound n-hexadecane has a cetane rating of 100. By contrast, an isomerized version of n-hexadecane to have one or more branches with methyl groups would be expected to have a cetane rating of 55 or 60.

Light diesel fractions (or jet fuel fractions) typically have lower cetane ratings than heavy diesel fractions due to the lower molecular weight of the average component. A typical light diesel fraction or jet fuel fraction may only have a cetane rating of 40-45. Even though an isomerized $C_{16}$ molecule has a lower cetane rating than the n-alkane version, the cetane value of the isomerized $C_{16}$ molecule will typically be higher than the cetane rating for a light diesel fraction. A similar situation will occur for other cut points in the range of about 250° C. to about 370° C. In embodiments where the diesel dewaxing is performed using a dewaxing catalyst that operates primarily by isomerization, the portion of the light diesel fraction (or jet fuel fraction) formed during dewaxing is believed to enhance the cetane of the overall light diesel fraction (or jet fuel fraction). This improvement to the light diesel fraction can be achieved without having to perform a separate fractionation on the output from the dewaxing stages. Instead, the light diesel fraction withdrawn from the common volume of the divided wall fractionator includes both the light diesel from the hydrotreating stage and the light diesel from the dewaxing stage.

Still another potential advantage is reducing saturation of aromatics in a light diesel fraction. Saturation of aromatic compounds to corresponding cycloalkyl compounds typically provides only a modest cetane benefit. However, aromatic saturation processes can consume a substantial amount of hydrogen. By separating out the light diesel fraction before dewaxing, additional aromatic saturation on compounds in the light diesel fraction is avoided. Additionally, aromatics in a diesel fuel contribute to the lubricity of the fuel. Saturation of the aromatics in a light diesel fraction may reduce the lubricity to below a desirable value in some applications. Separating out the light diesel fraction before dewaxing preserves the aromatics present in the light diesel fraction.

Feedstocks

In an embodiment, a feedstock can have an initial boiling point of at least about 200° F. (93° C.), or at least about 250° F. (121° C.), or at least about 300° F. (149° C.), or at least about 350° F. (177° C.), or at least about 400° F. (204° C.), or at least about 450° F. (232° C.). The initial boiling can vary widely, depending on how much kerosene or other lighter distillate components are included in a feedstock. In another embodiment, the feedstock can have a final boiling point of about 800° F. (427° C.) or less, or about 750° F. (399° C.) or less, or about 700° F. (371° C.) or less. Alternatively, in embodiments where fractionation is used to produce both a heavy diesel fraction and a separate bottoms fraction, the final boiling point can be about 1100° F. (593° C.) or less, or about 1000° F. (538° C.) or less, or about 900° F. (482° C.) or less. Another way of characterizing a feedstock is based on the boiling point required to boil a specified percentage of the feed. For example, the temperature required to boil at least 5 wt % of a feed is referred to as a "T5" boiling point. When characterizing a feed based on a T5 boiling point, the feedstock can have a T5 boiling point at least about 200° F. (93° C.), or at least, about 250° F. (121° C.), or at least about 300° F. (149° C.), or at least about 350° F. (177° C.), or at least about 400° F. (204° C.), or at least about 450° F. (232° C.). In another embodiment, the feed can have a T95 boiling point of about 800° F. (427° C.) or less, or about 750° F. (399° C.) or less, or about 700° F. (371° C.) or less. Examples of suitable feeds include various atmospheric and/or vacuum gas oil feeds, diesel boiling range feeds, and feeds corresponding to mixtures thereof.

In some embodiments, the feedstock generally comprises a mineral oil. By "mineral oil" is meant a fossil/mineral fuel source, such, as crude oil, and not the commercial organic product, such as sold under the CAS number 8020-83-5, e.g., by Aldrich. Examples of mineral oils can include, but. are not limited to, straight run (atmospheric) gas oils, vacuum gas oils, demetallized oils, coker distillates, cat cracker distillates, heavy naphthas, diesel boiling range distillate fraction, jet fuel boiling range distillate fraction, kerosene boiling range distillate fraction, and coal liquids. The mineral oil portion of the feedstock can comprise any one of these example streams or any combination thereof. Preferably, the feedstock does not contain any appreciable asphaltenes.

Mineral feedstreams suitable for use in various embodiments can have a nitrogen content from about 10 wppm to about 6000 wppm nitrogen, such as at least about 50 wppm, and preferably at least about 500 wppm, such as at least about 750 wppm or at least about 1000 wppm or at least about 1500 wppm. Although feedstreams with lower nitrogen contents can be processed in a two stage reaction system, one of the benefits of having the hydrotreating and dewaxing reactions occur in separate stages is the opportunity to remove gas phase nitrogen contaminants between the stages. The $NH_3$ generated from hydrotreatment of a feed with less than 500 wppm of nitrogen can often be managed in a reaction system without a gas phase separation between hydrotreating and dewaxing stages. In an embodiment, feedstreams suitable for use herein have a sulfur content from about 100 wppm to about 40,000 wppm sulfur, preferably about 200 wppm to about 30,000 wppm, and more preferably about 350 wppm to about 25,000 wppm.

In various embodiments of the invention, the feed can also include portions of the feed that are from biocomponent sources. The feed can include varying amounts of feedstreams based on biocomponent sources, such as vegetable oils, animal fats, fish oils, algae oils, etc. For a biocomponent feed that has been previously hydroprocessed or that is otherwise compatible with conventional refinery equipment, the feed could potentially be entirely derived from a biocomponent source. More typically, the feed can include at least 0.1 wt % of feed based on a biocomponent source, or at least 0.5 wt %, or at least 1 wt %, or at least 3 wt %, or at least 10 wt %, or at least 15 wt %. In such embodiments, the feed can include 90 wt % or less of a feed based on a biocomponent source, or 60 wt % or less, or 40 wt % or less, or 20 wt % or less. In other embodiments, the amount of co-processing can be small, with a feed that includes at least 0.5 wt % of feedstock based on a biocomponent source, or at least 1 wt %, or at least 2.5 wt %, or at least 5 wt %. In such an embodiment, the feed can include 20 wt % or less of biocomponent based feedstock, or 15 wt % or less, or 10 wt % or less, or 5 wt % or less.

In the discussion below, a biocomponent feed or feedstock refers to a hydrocarbon feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. A biocomponent portion of a feed can be a portion that has been previously hydroprocessed, a portion that has not been previously hydroprocessed, or a combination thereof.

Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof. Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes. In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans*, *Scenedesmus dimorphus*, *Euglena gracilis*, *Phaeodactylum tricornutum*, *Pleurochrysis carterae*, *Prymnesium parvum*, *Tetraselmis chui*, and *Chlamydomonas reinhardtii*. Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prothotheca, Pseudochlorella, Pyramimonas, Pyrobotrys, Scenedesmus, Skeletonema, Spyrogyra, Stichoccus, Tetraselmis, Thalassiosira, Viridiella*, and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodu-*

*laria, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema,* and *Xenococcus* species.

Other biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. In one embodiment, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

In some embodiments, a feed containing a biocomponent portion will include previously hydroprocessed biocomponent portions. Biocomponent feeds that are previously hydroprocessed will typically have reduced levels of heteroatoms such as oxygen or nitrogen. Such previously hydroprocessed biocomponent feeds can be used in small quantities, such as at least and possibly could be used as the entire feed.

In other embodiments, the biocomponent portion of the feedstock (such as the glycerides and/or fatty acid esters) can include a non-hydrotreated portion. A non-hydrotreated feed can typically have an olefin content and an oxygen content similar to the content of the corresponding raw biocomponent material. Examples of suitable biocomponent feeds can include food grade vegetable oils, and biocomponent feeds that are refined, bleached, and/or deodorized. Other suitable biocomponent feeds include feeds derived from an algae source.

In some embodiments where a biocomponent portion is included in the feed, the feedstock can include at least about 1% by weight of glycerides, lipids, fatty acids, fatty acid esters (such as fatty acid alkyl esters), or a combination thereof. The gylcerides can include monoglycerides, diglycerides, or triglycerides. In other embodiments, the feedstock can include at least about 5 wt %, or at least about 10 wt %, or at least 20 wt % of glycerides, lipids, fatty acids, fatty acid esters, fatty acid alkyl esters, or a combination thereof. Alternatively, the feedstock can include about 55 wt % or less, or about 35 wt % or less, or about 25 wt % or less, or about 20 wt % or less of glycerides, lipids, fatty acids, fatty acid esters, fatty acid alkyl esters, or a combination thereof. In an embodiment, the feedstock can include glycerides and/or fatty acid esters. Preferably, when the feedstock includes a biocomponent portion, the feedstock can include triglycerides, fatty acid methyl esters, or a combination thereof.

Biocomponent based diesel boiling range feedstreams can have a wide range of nitrogen and/or sulfur contents. For example, a biocomponent based feedstream based on a vegetable oil source can contain up to about 300 wppm nitrogen. In contrast, a biomass based feedstream containing whole or raptured algae can sometimes include a higher nitrogen content. Depending on the type of algae, the nitrogen content of an algae based feedstream can be at least about 2 wt %, for example at least about 3 wt %, at least about 5 wt %, or at least about 10 wt %, and algae with still higher nitrogen contents are known. The sulfur content of a biocomponent feed can also vary. In some embodiments, the sulfur content can be about 500 wppm or less, for example about 100 wppm or less, about 50 wppm or less, or about 10 wppm or less.

Aside from nitrogen and sulfur, oxygen can be another heteroatom component in biocomponent based feeds. A biocomponent diesel boiling range feedstream based on a vegetable oil, prior to hydrotreatment, can include up to about 10 wt % oxygen, or up to about 12 wt %, or up to about 14 wt %. Additionally or alternately, such a biocomponent diesel boiling range feedstream can include at least about 1 wt % oxygen, for example at least about 2 wt %, at least about 3 wt %, at least about 4 wt %, at least about 5 wt %, at least about 6 wt %, or at least about 8 wt %. Further additionally or alternately, a biocomponent feedstream, prior to hydrotreatment, can include an olefin content of at least about 3 wt %, for example at least about 5 wt % or at least about 10 wt %.

Divided Wall Column as a Fractionator

In various embodiments, a divided wall column can be employed as a fractionation tower. The divided wall column can contain at least three separate volumes. One of the volumes is a common volume toward the top of the divided wall column. The remaining volumes in the divided wall column represent volumes separated from each other by a dividing wall. The various volumes are all in fluid communication via the common volume. However, petroleum fractions with a sufficiently high boiling point will not travel up the column to a sufficient height to reach the common volume.

In various embodiments below, the divided wall column will be described as having one common volume and two separated volumes. However, a divided wall column could also have three or more separated volumes.

The volumes can be arranged in any configuration that is convenient for the desired fractionations. One option is to have each of the separated volumes occupy equal portions of the divided section. For example, a divided wall column with two separated area and one common area above could have each of the separated areas occupy half of the lower portion of the divided wall column. Similarly, a divided wall, column with three separated areas could have each separated area occupy a third of the lower portion. Alternatively, each of the separated areas can have a different volume.

In various embodiments, the position of the dividing wall can be any convenient position that leads to the appropriate volumes for the separated areas. For a divided wall column having a roughly round cylindrical shape, one option is to have a dividing wall that corresponds to a diameter of the column. This would produce two separated areas with equal volumes. Another option is to have a dividing wall that corresponds to a chord connecting two points on the circumference of the round shape, thus leading to different volumes for each separated volume. Still another option would be to have a dividing wall that creates concentric circular volumes for the separated portions. While it is believed that roughly round cylindrical shapes are preferred for the external shell of divided wall columns, the above placements for a dividing wall can be equally applied to columns having other shapes.

In an embodiment, the dividing wall can have a height that is tall enough to allow for removal of at least one fraction from a separated volume within the column. This means that at least one fraction that does not mix with the common volume can be removed from a separated area. Additionally, the dividing wall can have a height that is low enough so that at least two fractions can be removed from the common volume, and preferably at least three fractions. For example, a common volume can be used to produce at least a naphtha fraction and a light diesel fraction, while heavier diesel fractions are removed from the separated volumes. If the fractionator is also used to separate out gas phase components such as light ends and contaminants ($H_2S$, $NH_3$), the gas phase components can be viewed as a third fraction that is removed from the common volume. Still other optional fractions can also be removed, such as by removing a separate kerosene fraction, multiple light diesel fractions, or multiple naphtha fractions.

Alternatively, the height of the dividing wall can be selected based on the location of a condensing zone in the column. For a given product produced by a distillation column, the condensing zone or stage for the product represents an upper limit for the expected height of travel for vapor of the given product. For the example of preventing contamination between diesel fractions, selecting a dividing wall height corresponding to the condensing zone for a diesel fraction would be expected to limit contamination to about 1 wt % or less, or about 0.1 wt % or less, or about 0.05 wt % or less.

In still another embodiment, the height of the dividing wall can be selected in relation to one or more features of the divided wall column. For example, the height of the dividing wall can be selected to correspond to about the height between the bottom of the column and the height of the flash zone. In another embodiment, the height of the dividing wall can correspond to the height of the bottom section of trays in the column.

In yet another embodiment, the height of the dividing wall can be at least about 15% of the height of the divided wall column, or at least about 25%, or at least about 30%. Alternatively, the height of the dividing wall can be about 50% or less of the height of the divided wall column, or about 40% or less, or about 30% or less. The height of the divided wall column can be about 25 meters or less, or about 35 meters or less, or about 50 meters or less, or about 75 meters or less, or about 100 meters or less.

The diameter of a divided wall column can be selected so that the cross-sectional areas of the separate volumes roughly correspond to the cross-sectional areas of the individual fractionation columns that are being replaced. In an embodiment, the cross-sectional areas of the separate volumes can be within about 10% or less of the cross-sectional areas of the individual fractionation columns being replaced, or within about 5% or less.

In an embodiment, the interior of the divided wall column can include typical components of a fractionator. For example, a series of trays can be located in the divided wall column to assist with fractionation. Some of the trays can be located in the common volume. Other trays can be located in the separate volumes. The tray locations and/or spacing in the separate volumes can be the same or different in each volume. As an alternative to trays, any other type of internal structure typically found in a fractionator can be used, such as random packings, structured packings, grids, liquid and vapor distributors, and liquid and vapor collectors. The divided wall column can also include other typical fractionator parts, such as a flash zone or a sump.

Hydrotreatment

In an embodiment, the reaction system can include the following features. The feedstock is first treated in a by hydrotreatment reactor including one or more hydrotreatment stages or beds. The reaction conditions in a hydrotreatment stage can be conditions suitable for reducing the sulfur content of the feedstream. The reaction conditions can include an LHSV of 0.3 to 5.0 $hr^{-1}$, a total pressure from about 500 psig (3.4 MPa) to about 3000 psig (20.7 MPa), a treat gas containing at least about 80% hydrogen (remainder inert gas), and a temperature of from about 500° F. (260° C.) to about 800° F. (427° C.). Preferably, the reaction conditions include an LHSV of from about 0.5 to about 1.5 $hr^{-1}$, a total pressure from about 1400 psig (9.7 MPa) to about 2000 psig (13.8 MPa), and a temperature of from about 700° F. (371° C.) to about 750° F. (399° C.).

Optionally, the stages in the hydrotreatment reactor can be operated at a pressure below about 700 psig (4.8 MPa), or below about 800 psig (5.5 MPa). For example, the pressure in a stage in the hydrotreatment reactor can be at least about 300 psig (2.1 MPa), or at least about 350 psig (2.4 MPa), or at least about 400 psig (2.8 MPa), or at least about 450 psig (3.1 MPa). The pressure in a stage in the hydrotreatment reactor can be about 700 psig (4.8 MPa) or less, or about 650 psig (4.5 MPa) or less, or about 600 psig (4.1 MPa) or less. Optionally, the hydrotreatment reactor can also include one or more other types of stages or beds, such as hydrocracking or hydrofinishing beds. The hydrotreatment stages (plus any other optional stages) can reduce the sulfur content of the feed to a suitable level. For example, the sulfur content can be reduced sufficiently so that the feed into the dewaxing stage can have at least about 100 wppm of sulfur, or at least about 150 wppm, or at least about 200 wppm. The sulfur content can be reduced sufficiently so that the feed into the dewaxing stage can have about 500 wppm sulfur or less, or about 400 wppm or less, or about 300 wppm or less, or about 250 wppm or less.

The catalyst in a hydrotreatment stage can be a conventional hydrotreating catalyst, such as a catalyst composed of a Group VIB metal (corresponding to Group 6 of the modern IUPAC Periodic Table of Elements unless otherwise noted herein) and/or a Group VIII metal (corresponding to Groups 8-10 of the modern IUPAC Periodic Table of Elements unless otherwise noted herein) on a support. Suitable metals include cobalt, nickel, molybdenum, tungsten, or combinations thereof. Preferred combinations of metals include nickel and molybdenum or nickel, cobalt, and molybdenum. Suitable supports include silica, silica-alumina, alumina, and titania.

In an embodiment, the amount of treat gas delivered to the hydrotreatment stage can be based on the consumption of hydrogen in the stage. The treat gas rate for a hydrotreatment stage can be from about two to about five times the amount of hydrogen consumed per barrel of fresh feed in the stage. A typical hydrotreatment stage can consume from about 50 SCF/B (8.4 $m^3/m^3$) to about 1000 SCF/B (168.5 $m^3/m^3$) of hydrogen, depending on various factors including the nature of the feed being hydrotreated. Thus, the treat gas rate can be from about 100 SCF/B (16.9 $m^3/m^3$) to about 5000 SCF/B (842 $m^3/m^3$). Preferably, the treat gas rate can be from about four to about five time the amount of hydrogen consumed. Note that the above treat gas rates refer to the rate of hydrogen flow. If hydrogen is delivered as part of a gas stream having less than 100% hydrogen, the treat gas rate for the overall gas stream can be proportionally higher.

The hydrotreating conditions can be selected to reduce the sulfur and/or the nitrogen content of the feed to a desired level. One option is to hydrotreat the feed under conditions effective to reduce the sulfur to less than about 50 wppm, or less than about 15 wppm, or less than about 10 wppm. The amount of sulfur remaining can be dependent on the desired standard for the country of use. The amount of nitrogen can similarly be reduced to about 15 wppm or less, or about 10 wppm or less, or about 1 wppm or less.

Fractionation of the Hydrotreating Effluent

The effluent from the hydrotreatment reactor is then passed into a fractionation tower or other fractionator. The hydrotreated feed is fractionated to separate out a plurality of fractions. One fraction will typically correspond to gas phase hydrocarbons (such as light ends) as well as contaminants generated during hydrotreatment such as $H_2S$ and/or $NH_3$. Another fraction can correspond to a light diesel fraction, as will be described in greater detail herein. A third fraction can correspond to a heavy diesel fraction. In some embodiments, the heavy diesel fraction will correspond to a bottoms fraction from the fractionator, while in other embodiments the heavy diesel fraction is different from the bottoms fraction. Still other optional fractions can correspond to a naphtha fraction or a kerosene fraction.

For the light diesel fraction, cut points can be selected for both the lower and upper boiling point of the light diesel. For example, the lower cut point for the light diesel fraction can be selected as about 350° F. (177° C.), or about 375° F. (191° C.). Alternatively, the light diesel lower cut point can be selected to include more molecules from the kerosene boiling range, such as a cut point of about 250° F. (121° C.), or about 300° F. (149° C.), or about 325° F. (163° C.). If it is desired to form a jet fuel fraction instead of a light diesel fraction, the lower cut point can be selected as about 315° F. (157° C.) or about 325° F. (163° C.).

The upper cut point for the light diesel fraction can be selected based on a variety of criteria. One option is to use the upper cut point to form a light diesel fraction with desired cold flow properties, such as a desired cloud point. By selecting an appropriate cut point, the cloud point for the light diesel fraction can be about −12° C. or less, or about −18° C. or less, or about −24° C. or less. Such diesel cloud points are suitable for use as standard diesel fuels. If a winter diesel is desired, the cut point can be selected so that the light diesel fraction has a cloud point of about −30° C. or less, or about −36° C. or less, or about −42° C. or less. Such cloud point values may also correspond to a freeze point of −40° C. to −47° C., which corresponds to the requirement for various types of jet fuel fractions.

Another option for selecting the upper cut point is to match a desired volume constraint for the dewaxing reactor. One of the advantages of forming a light diesel and a heavy diesel fraction is that the amount of effluent passed into the dewaxing stage(s) is substantially lower. This allows a smaller reactor to be used. This also saves on hydrogen costs, as lower boiling molecules that already have a satisfactory cloud point (or other cold flow property) are not cracked, isomerized, saturated, or otherwise reacted in a reaction that potentially consumes hydrogen.

Still another option for selecting the upper cut point is based on a requirement for the fraction. For example, if a jet fuel fraction is being formed (as opposed to a typical light diesel), the cut point can be set at 575° F. (302° C.), When the upper cut point is set based on another criteria, such as the volume constraint and/or the desired cloud point criteria mentioned above, the upper cut point will depend on the nature of the feed. The upper cut point can be set to at least about 500° F. (260° C.), or at least about 550° F. (288° C.), or at least about 600° F. (316° C.), or at least about 650° F. (343° C.). The lower cut points are more likely to correspond to winter diesel cut points, while the higher cut points are more likely to correspond to standard diesel cut points. Alternatively, the upper cut point can be about 700° F. (371° C.) or less, or about 650° F. (343° C.) or less, or about 600° F. (316° C.) or less, or about 575° F. (302° C.) or less.

The lower cut point for the heavy diesel fraction will typically correspond to the upper cut point for the light diesel fraction. In some embodiments, the heavy diesel will correspond to the bottoms fraction from fractionation of the hydrotreating effluent. In this situation, no cut point is needed, as the entire bottoms is used as the heavy diesel fraction. This type of embodiment would typically be used when the feed roughly corresponds to a diesel boiling range feed. Alternatively, this type of configuration could be used in situations where portions of the feed heavier than a heavy diesel will be carried through the system until after the dewaxing stage. In other embodiments, the heavy diesel can be a separate fraction from the bottoms fraction. In such embodiments, the upper cut point for the heavy diesel fraction can be about 825° F. (441° C.) or less, or about 800° F. (427° C.) or less, or about 750° F. (399° C.) or less. Alternatively, the upper cut point can be at least about 700° F. (371° C.) or at least about 750° F. (399° C.).

Dewaxing of Heavy Diesel Fraction

After fractionation, at least a portion of the heavy diesel can be passed to a second reactor that includes at least one catalytic dewaxing stage. The second reactor can contain only dewaxing stages, or dewaxing stages and one or more optional hydrofinishing stages following the dewaxing stages. The second reactor can remove additional sulfur from the feed, as well as improving the cold flow properties of the feed. The dewaxed diesel product is fractionated again to produce at least a diesel product and one or more lower boiling products, such as a light ends/contaminants product and a naphtha product. Optionally, the fractionation can generate at least a light diesel product and a heavy diesel product.

Generally, catalytic dewaxing can be accomplished by selective hydrocracking or by isomerizing long chain molecules within a feed such as a diesel range feed. Hydrodewaxing catalysts can be selected from molecular sieves such as crystalline aluminosilicates (zeolites) or silico-aluminophosphates (SAPOs). In an embodiment, the molecular sieve can be a 1-D or 3-D molecular sieve. In an embodiment, the molecular sieve can be a 10-member ring 1-D molecular sieve. Examples of molecular sieves can include ZSM-48, ZSM-23, ZSM-35, Beta, USY, ZSM-5, and combinations thereof. In an embodiment, the molecular sieve can be ZSM-48, ZSM-23, or a combination thereof. Optionally, the dewaxing catalyst can include a binder for the molecular sieve, such as alumina, titania, silica, silica-alumina, zirconia, or a combination thereof. In an embodiment, the binder can be alumina, titania, or a combination thereof. In another embodiment, the binder can be titania, silica, zirconia, or a combination thereof.

One feature of molecular sieves that can impact the activity of the molecular sieve is the ratio of silica to alumina in the molecular sieve. In an embodiment, the molecular sieve can have a silica to alumina ratio of about 200 to 1 or less, or about 120 to 1 or less, or about 100 to 1 or less, or about 90 to 1 or less, or about 75 to 1 or less. In an embodiment, the molecular sieve can have a silica to alumina ratio of at least about 30 to 1, or at least about 50 to 1, or at least about 65 to 1.

The dewaxing catalyst can also include a metal hydrogenation component, such as a Group VIII metal. Suitable Group VIII metals can include Pt, Pd, or Ni. The dewaxing catalyst can include at least about 0.1 wt % of a Group VIII metal, or at least about 0.3 wt %, or at least about 0.5 wt %, or at least about 1.0 wt %, or at least about 2.5 wt %, or at least about 5.0 wt %. Alternatively, the dewaxing catalyst can include about 10.0 wt % or less of a Group VIII metal, or about 5.0 wt % or less, or about 2.5 wt % or less, or about 1.5 wt % or less.

In some embodiments, the dewaxing catalyst can also include a Group VIB metal, such as W or Mo. An example of such an embodiment could be a dewaxing catalyst that includes Ni and W, Mo, or a combination of W and Mo. In such an embodiment, the dewaxing catalyst can include at least about 0.5 wt % of a Group VIB metal, or at least about 1.0 wt %, or at least about 2.5 wt %, or at least about 5.0 wt %. Alternatively, the dewaxing catalyst can include about 20.0 wt % or less of a Group VIB metal, or about 15.0 wt % or less, or about 10.0 wt % or less, or about 5.0 wt % or less, or about 1.0 wt % or less. In an embodiment, the dewaxing catalyst can include Pt, Pd, or a combination thereof. In another embodiment, the dewaxing catalyst can include Ni and W, Ni and Mo, or Ni, W, and Mo.

Catalytic dewaxing can be performed by exposing a feedstock to a dewaxing catalyst under effective (catalytic) dewaxing conditions. Effective dewaxing conditions can include a temperature of at least about 500° F. (260° C.), or at least about 550° F. (288° C.), or at least about 600° F. (316° C.), or at least about 650° F. (343° C.). Alternatively, the temperature can be about 750° F. (399° C.) or less, or about 700° F. (371° C.) or less, or about 650° F. (343° C.) or less. The pressure can be at least about 400 psig (2.8 MPa), or at least about 500 psig (3.4 MPa), or at least about 750 psig (5.2 MPa), or at least about 1000 psig (6.9 MPa). Alternatively, the pressure can be about 1500 psig (10.3 MPa) or less, or about 1200 psig (8.2 MPa) or less, or about 1000 psig (6.9 MPa) or less, or about 800 psig (5.5 MPa) or less. The Liquid Hourly Space Velocity can be at least about 0.5 $hr^{-1}$, or at least about 1.0 $hr^{-1}$, or at least about 1.5 $hr^{-1}$. Alternatively, the LHSV can be about 5.0 $hr^{-1}$ or less, or about 3.0 $hr^{-1}$ or less, or about 2.0 $hr^{-1}$ or less. The treat gas rate can be at least about 500 scf/bbl (84 $m^3/m^3$), at least about 750 scf/bbl (126 $m^3/m^3$), or at least about 1000 scf/bbl (169 $m^3/m^3$). Alternatively, the treat gas rate can be about 2000 scf/bbl (337 $m^3/m^3$) or less, or about 1500 scf/bbl (253 $m^3/m^3$) or less, or about 1250 scf/bbl (211 $m^3/m^3$) or less.

The dewaxing conditions can be selected to be effective for achieving a desired cloud point for the dewaxed effluent. Preferably, the dewaxing conditions are selected so that the dewaxed effluent has substantially the same cloud point as the light diesel fraction. In some alternative embodiments a divided wall fractionator may be used. In such embodiments, the dewaxing conditions can be selected either so that the dewaxed effluent has substantially the same cloud point as the light diesel fraction from the common volume, or so that the heavy diesel fraction from the second separate volume has substantially the same cloud point as the light diesel fraction from the common volume. Herein, two fractions are defined as having substantially the same cloud point when the cloud points of the fraction differ by 2.0° C. or less. In more preferred embodiments, the dewaxed effluent has a cloud point within +/−1.0° C., even more preferably +/−0.5° C., of the light diesel fraction.

In preferred embodiments, at least a portion of the dewaxed effluent is further combined with at least a portion of the light diesel fraction to form a combined diesel product. In preferred embodiments, the combined diesel product has a cloud point within +/−2.0° C., more preferably within +/−1.0° C., and even more preferably +/−0.5° C., of the light diesel fraction.

If an optional hydrofinishing stage is included in the second reactor, hydrofinishing catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is about 30 wt % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as about 20 wt % for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41.

Hydrofinishing conditions can include temperatures from about 125° C. to about 425° C., or about 180° C. to about 280° C., a total pressure from about 300 psig (2.1 MPa) to about 800 psig (5.5 MPa), or about 400 psig (2.8 MPa) to about 700 psig (4.8 MPa), and a liquid hourly space velocity from about 0.1 $hr^{-1}$ to about 5 $hr^{-1}$ LHSV, preferably about 0.5 $hr^{-1}$ to about 1.5 $hr^{-1}$. The treat gas rate can be selected in accordance with the procedure described above for a hydrotreatment stage.

Fractionation of the Dewaxing Effluent

After dewaxing and any optional hydrofinishing, the effluent from dewaxing is passed into a fractionator. Optionally, the effluent can be passed into a gas-liquid separator prior to fractionation. The fractionator allows for separation of the dewaxed effluent into at least a diesel fraction and a lighter fraction. Optionally, the fractionation can result in a heavy diesel fraction, a light diesel or jet fraction, and one or more lighter fractions such as naphtha fractions, kerosene fractions, or light ends. The various fractionation cut points can be selected to be similar to the cut points for the fractionation of the hydrotreating effluent. If only a diesel fraction is formed, as opposed to forming a light diesel fraction and a heavy diesel fraction, the lower cut point can correspond to a light diesel fraction lower cut point while the upper cut point corresponds to a heavy diesel fraction upper cut point.

Processes Utilizing a Divided Wall Fractionator

Preferably, the fractionators after the hydrotreating stage and the dewaxing stage can be combined into a single divided wall column fractionator. One example of a suitable reaction system includes two reactors and a divided wall column. In such an embodiment, a feedstock is passed into a first reactor. The first reactor can include one or more stages for hydrotreatment, hydrocracking, or another type of conversion process.

The effluent from the first reactor can then be passed to a divided wall column. The effluent can enter the divided wall column in a first separated volume. The divided wall column can fractionate the first effluent into a bottoms portion, optionally another portion that leaves the divided wall column from the separated volume, and a lighter portion that enters a common volume in the divided wall column. In an embodiment where the bottoms portion corresponds to a feed that boils in the vacuum gas oil range, such as a bottoms portion suitable for use as a feed to a fluid catalytic cracking process, the additional portion that leaves the divided wall column from the separated volume can be a heavy diesel fraction. Alternatively, the heavy diesel fraction can correspond to the bottoms fraction.

At least, a portion of the heavy diesel fraction from the first (separated) volume of the divided wall column can then be passed to a second reactor. Optionally, at least a portion of any additional cuts that exit from the first volume can also be passed to the second reactor. The second reactor can include one or more catalytic dewaxing stages, optionally followed by one or more hydro finishing stages.

The effluent from the second reactor can then be passed to a second separated volume in the divided wall column for fractionation. The second volume can fractionate the effluent from the second reactor into at least a heavy diesel portion and a portion that enters the common volume. In an embodiment, all portions of fractionated effluents that enter the common volume can be fractionated into at least a light diesel or jet cut. Additionally, one or more product cuts can be withdrawn, such as a kerosene cut, one or more types of naphtha cuts, or light ends.

Sample Configurations

FIG. 1 shows an example of a two stage reaction system for producing a diesel product. In FIG. 1, a suitable feed 105 for forming a diesel boiling range product is passed into a hydrotreatment reactor 110. A separate hydrogen feed (not shown) can also be introduced into the reactor, or hydrogen can be introduced along with the feed. The feed 105 is hydrotreated in the reactor 110 under effective hydrotreating conditions to reduce the sulfur and/or nitrogen content of the feed to a desired level. The hydrotreated effluent 115 is then passed into a fractionator 120. The fractionator generates a light ends fraction 121, one or more naphtha and/or kerosene fractions 122, a light diesel fraction 124, and a heavy diesel fraction 126. Optionally, a bottoms fraction (not shown) could also be generated.

At least a portion of heavy diesel fraction 126 is then passed into dewaxing stage 130. The dewaxed stage is operated under conditions effective for producing a dewaxed heavy diesel effluent with a cloud point that is about the same as the cloud point of the light diesel. The dewaxed effluent 135 is then fractionated 140. The fractionator 140 generates a light ends fraction 141, one or more naphtha fractions 142, and at least one diesel fraction. In the embodiment shown in FIG. 1, a single diesel fraction 146 is shown. Alternatively, separate light diesel and heavy diesel fractions can be formed. In FIG. 1, the diesel fraction 146 is combined with light diesel fraction 124 to form a diesel product 155.

Figure 2:
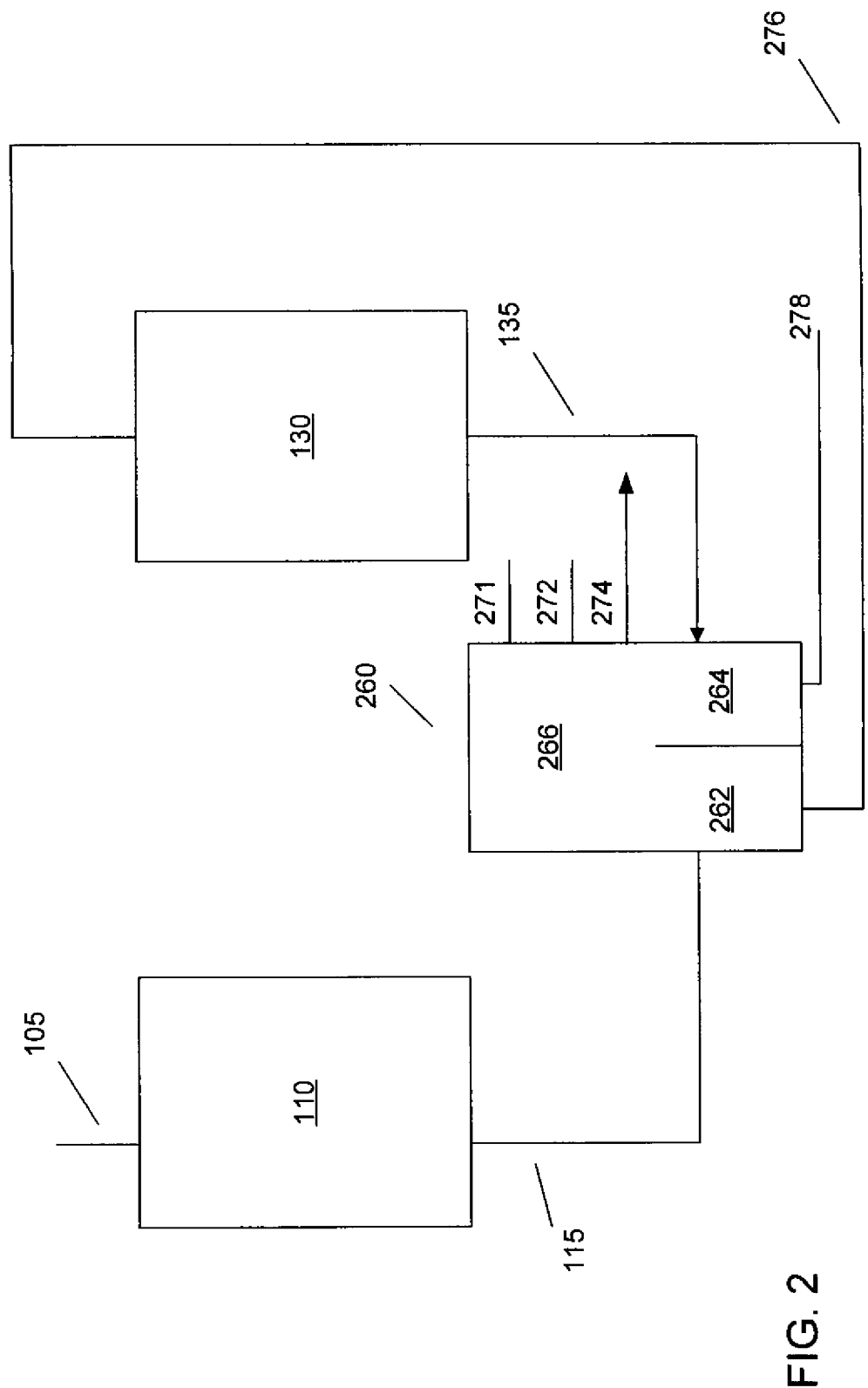
FIG. 2 shows an alternate embodiment reaction system for performing a process according to an embodiment of the invention.

FIG. 2 shows an alternate configuration that uses a divided wall column fractionator. In FIG. 2, elements 105 and 110 are essentially the same as in FIG. 1. In FIG. 2 the hydrotreated effluent 115 is passed into a first separate volume 262 of a divided wall fractionator 260. A heavy diesel fraction 276 is withdrawn from the first separate volume 262. Heavy diesel fraction 276 is shown as a bottoms fraction in FIG. 2, but alternatively a separate bottoms fraction could be produced. Fractionator 260 also produces a light ends fraction 271, one or more naphtha and/or kerosene fractions 272, and a light diesel or jet fuel fraction 274 from common volume 266. The heavy diesel fraction is then sent to a dewaxing stage 130. The dewaxed effluent 135 is then passed into second separate volume 264 of the divided wall fractionator. A heavy diesel product fraction 278 is withdrawn from separate volume 264. Optionally, at least a portion of the heavy diesel product fraction 278 can be combined (not shown) with light diesel fraction 274 to form a full range diesel product.

Simulated Example of Processing Embodiments

Simulations were performed to demonstrate the benefit of the separating out a light diesel fraction prior to dewaxing of a heavy diesel fraction. The simulations were based on kinetic models for reactions in various hydroprocessing environments. The kinetic models were tuned/fit based on both commercial and pilot plant data. The models also included the ability to simulate distillation of a feed based on boiling point characteristics of compounds in a feed. The feed (and resulting processed portions of feed) was represented as a mixture of known compounds from a molecular library.

In the simulations, a commercial raw diesel feed was modeled. The modeled feed had an API gravity of 36.9, a sulfur content of 1.0 wt %, and a total nitrogen content of 522 wppm. The feed had a total aromatics content of 26.0 wt %, a total paraffins content of 39.2 wt %, and a total naphthenes content of 33.3 wt %. The cetane index of the feed (predicted value under D976) was 50.4. The initial boiling point was 171° C. with a T5 boiling point was 174° C. The final boiling point was 388° C. with a T95 boiling point of 372° C.

A reaction system similar to the configuration shown in FIG. 1 was simulated for processing of the feed. The hydrotreatment stage included a conventional hydrotreating catalyst including NiMo supported on alumina. The reaction conditions included a temperature of 336° C., a space velocity (LHSV) of 0.9 hr$^{-1}$, a total pressure of 80 barg (8.0 MPag), and a total treat gas rate of 370 Sm$^3$/m$^3$ with 99.9% H$_2$. The conditions were sufficient in the simulation to reduce the sulfur content of the 180° C.+full range diesel to 10 ppmw of sulfur.

Figure 3:
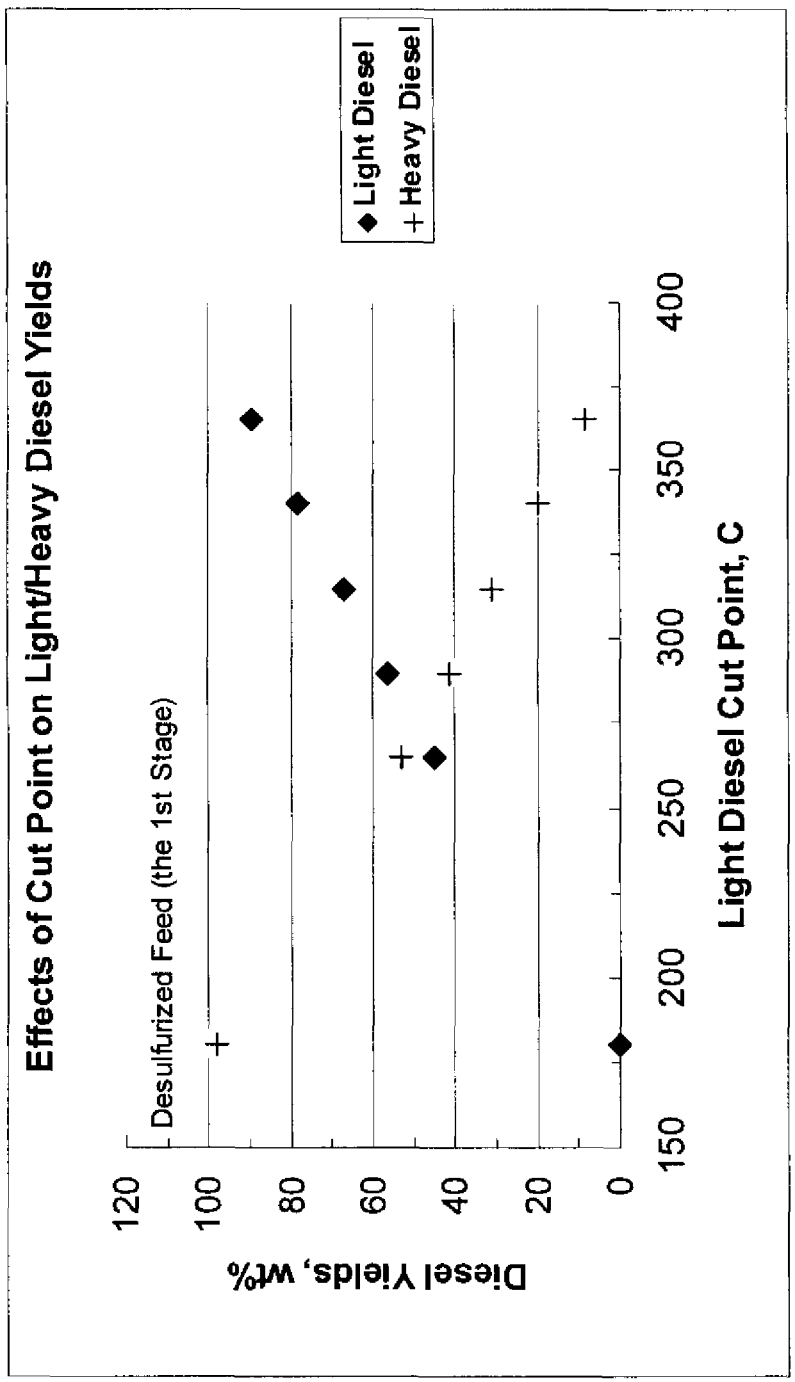
FIGS. 3, 4, 5, & 6 show simulated results from processing feeds according to an embodiment of the invention.

In various simulations, this full-range 180° C.++diesel was fractionated into light diesel and a heavy diesel fractions. Simulations were performed using light diesel upper cut points of 265° C., 290° C., 315° C., 340° C., and 365° C. Comparative simulations on the full range diesel (no light/heavy diesel fractionation) were also performed, FIG. 3 shows the relative amounts of desulfurized feed present in the light fraction and heavy fraction based on the selected fractionation cut point. As shown in FIG. 3, a cut point of 265° C. resulted in a roughly 50/50 split of the desulfurized feed into light diesel and heavy diesel. As the cut point increased, the amount of diesel in the light fraction increased, with up to about 90 wt % of the desulfurized diesel being in the light diesel fraction at 365° C.

Figure 4:
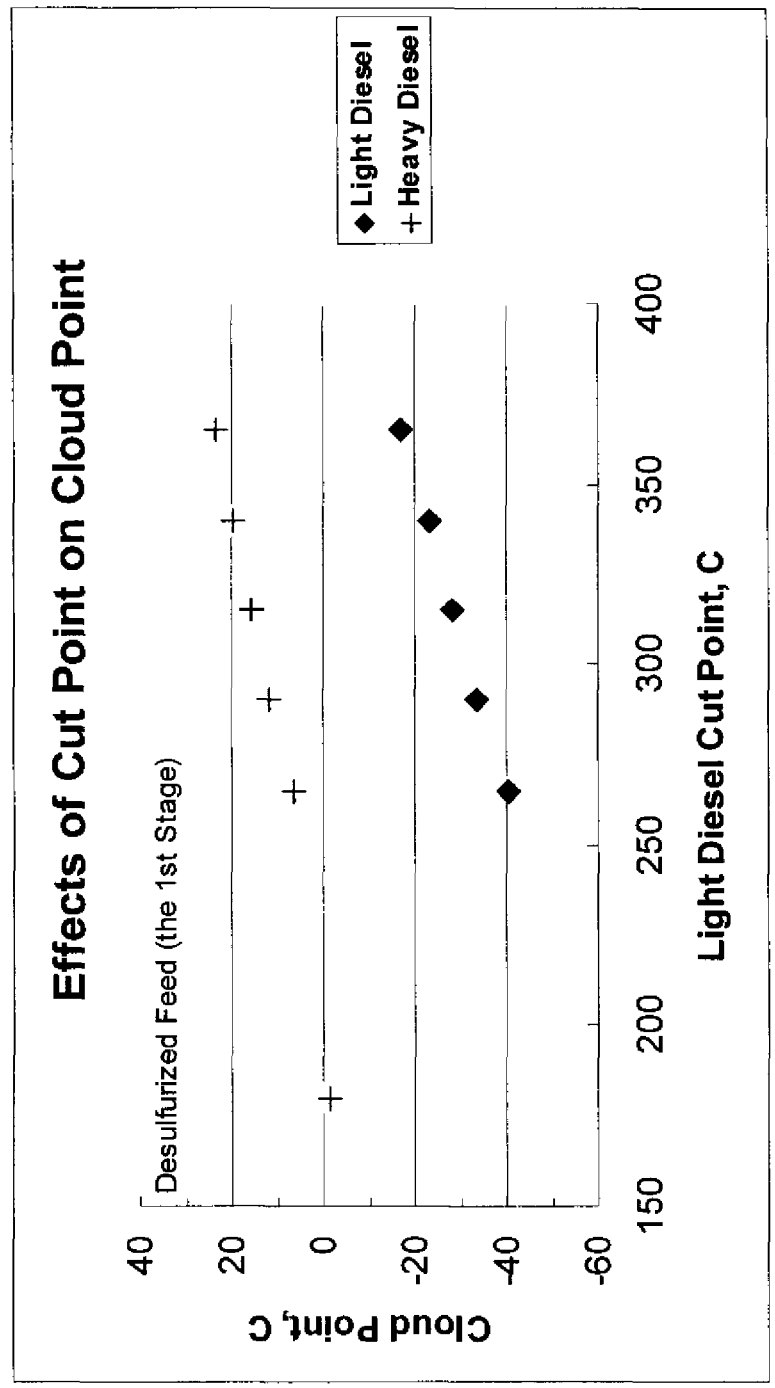

FIG. 4 shows the predicted cloud point for the light diesel fraction and heavy diesel fraction after fractionation but before any subsequent processing, such as dewaxing of the heavy diesel fraction. In FIG. 4, the full range diesel had a predicted cloud point of about 0° C. Based on the trend of cloud points, an upper cut point of about 295° C. or less would result in a light diesel fraction with a cloud point of −30° C. or less. Such a light diesel fraction would be suitable for inclusion in a typical winter diesel without further cloud point reduction. For cut points above 295° C. and up to the 365° C. cut point, the light diesel fractions had cloud points less than −10° C., making the light diesel fractions suitable for use in a summer grade diesel.

For each of the cut points, dewaxing of the heavy diesel fraction was simulated to reduce the cloud point sufficiently to create a combined light diesel/dewaxed heavy diesel product with a cloud point meeting a summer grade diesel specification of −13° C. Additionally, for the cut points below 295° C., dewaxing of the heavy diesel traction was simulated to reduce the cloud point sufficiently to form a combined light diesel/dewaxed heavy diesel product with a cloud point meeting a winter grade diesel specification of −30° C. The dewaxing stage was simulated as including a dewaxing catalyst containing 0.6 wt % Pt supported on an alumina bound ZSM- 48 catalyst having a silica to alumina ratio of about 110:1 or less. The reaction conditions included a space velocity (LHSV) of 2.9 hr$^{-1}$ and a once-through treat gas of 95% hydrogen at a flow rate of 300 Sm$^3$/m$^3$. The reaction temperature in the dewaxing stage varied to achieve the desired cloud point reduction.

For the summer diesel, the full range diesel required a reactor temperature of 312° C. to achieve the target cloud point of −13° C. The required reactor temperature for the heavy diesel fraction only ranged from 311° C. for the 265° C. cut point to 319° C. for the 315° C. cut point. The 340° C. and 365° C. cut points were actually at 318° C. and 317° C., respectively. This is believed to be due to the low volume of heavy diesel being blended in to the light diesel. Since the light diesel fraction in all cases had a cloud point below the summer diesel specification of −13° C., the heavy diesel could be dewaxed to a cloud point above −13° C., so that the total product achieved the desired target value.

For the winter diesel, the full range diesel required a reactor temperature of 331° C. to achieve the target cloud point of −30° C. The required reactor temperature for the heavy diesel fraction at a cut point of 265° C. was 333° C., while the heavy diesel at the 290° C. cut point required a reactor temperature of 338° C.

Figure 5:
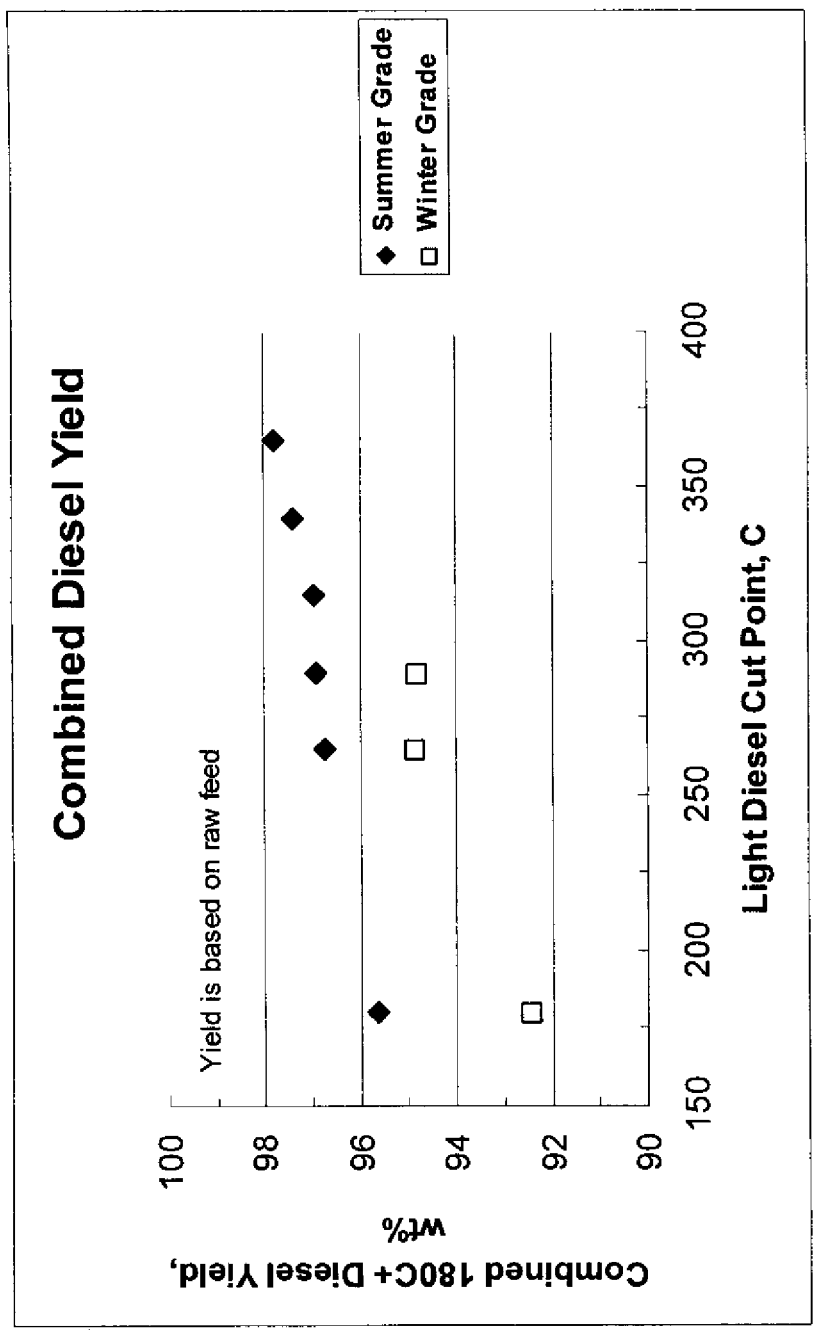

FIG. 5 shows the combined diesel yield (light diesel plus heavy diesel) relative to the initial feed for production of both summer grade and winter grade diesel. As shown in FIG. 5, increasing the upper cut point for the light diesel fraction resulted in a roughly equal yield or an improved yield for all of the cut points shown. For the summer grade diesel, this resulted in an increase of nearly 2 wt % for the 365° C. cut point relative to not fractionating the diesel prior to dewaxing. Greater yield increases of about 2.5-3% are shown for the winter grade diesel. FIG. 5 shows that increasing the upper cut point for the light diesel until the cloud point of the light diesel matches the desired cloud for the combined product will produce the highest total yield. This means that the heavy diesel fraction will be dewaxed to also meet the target cloud point.

Figure 6:
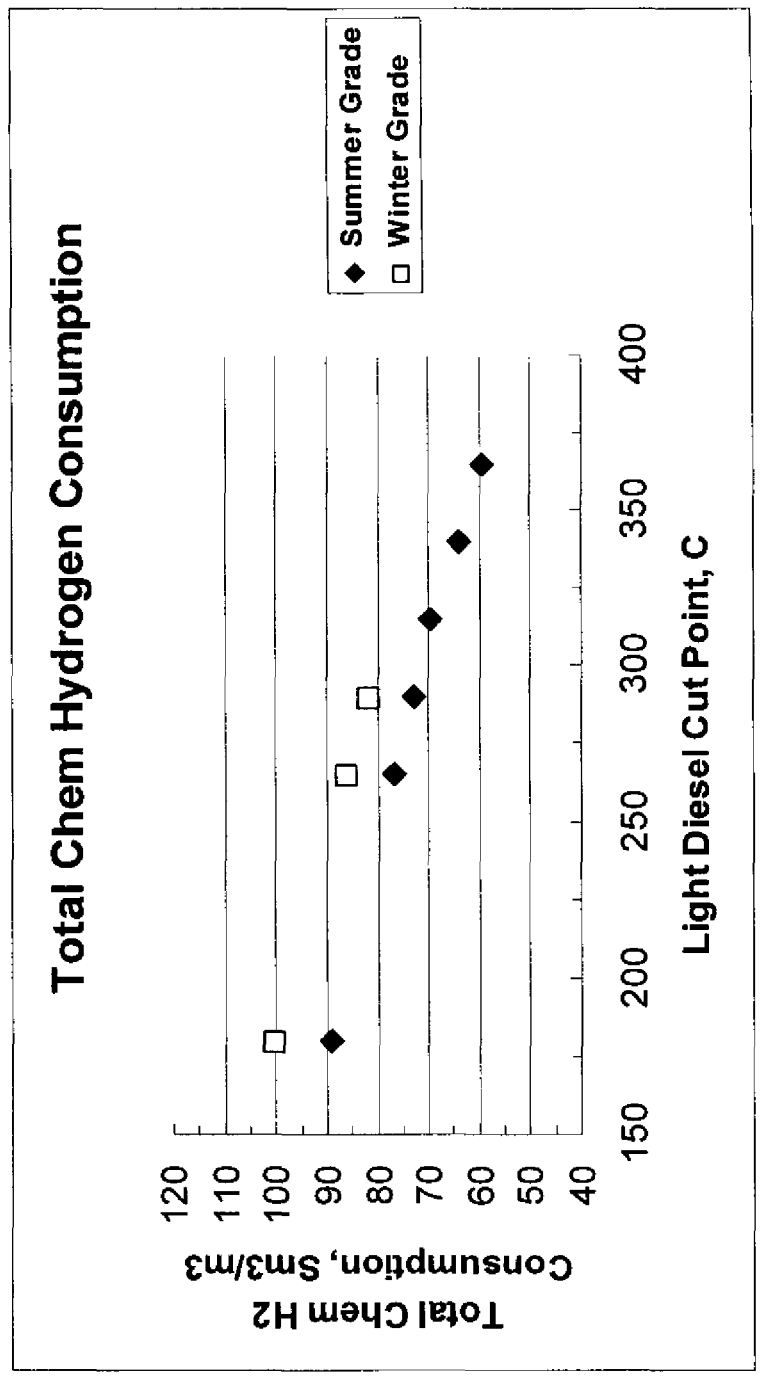

FIG. 6 shows the total hydrogen consumption during dewaxing for production of the summer grade and winter grade diesels described above. As shown in FIG. 6, increasing the upper cut point for the light diesel fraction results in a lower hydrogen consumption during dewaxing. This is due in part to the reduced volume of the heavy diesel being dewaxed as the upper cut point for the light, diesel is increased. FIG. 6 also demonstrates that it is desirable to cut a light diesel fraction so that the light diesel has a desired cloud point prior to blending with the dewaxed heavy diesel fraction.

Additional Embodiments

Embodiment 1. A method for producing distillate products is provided, comprising: hydrotreating a feedstock under effective hydrotreating conditions; fractionating at least a portion of the hydrotreated feedstock to form a heavy diesel fraction and a light diesel fraction; dewaxing the heavy diesel fraction under effective dewaxing conditions to produce a dewaxed heavy diesel fraction having a cloud point of about −10° C. or less; and fractionating the dewaxed heavy diesel fraction to form at least a heavy diesel product, the fractionation further producing an additional fraction.

Embodiment 2. A method according to embodiment 1, wherein the at least a portion of hydrotreated feedstock is passed into a first, separate volume of a divided wall separator for fractionation, the heavy diesel fraction being withdrawn from the first separate volume of the divided wall, fractionator; wherein the dewaxed heavy diesel fraction is passed into a second separate volume of the divided wall fractionator, the heavy diesel product being withdrawn from the second separate volume; and wherein the light diesel fraction and the additional fraction are withdrawn from a common volume of the divided wall fractionator as a combined light diesel fraction.

Embodiment 3. A method according embodiment 2, wherein the cloud point of the heavy diesel product is +/−1° C. of the cloud point of the combined light diesel fraction.

Embodiment 4. A method according to embodiments 2 or 3, further comprising combining at least a portion of the combined light diesel fraction with the heavy diesel product to form a combined diesel product, the combined diesel product having a cloud point that is +/−1° C. of the cloud point of the combined light diesel fraction and the heavy diesel product.

Embodiment 5. A method according to any of embodiments 2 to 4, further comprising withdrawing a naphtha fraction from the common volume of the fractionator.

Embodiment 6. A method according to any of the above embodiments, wherein the effective hydrotreating conditions comprise a pressure of from about 300 psig (2.1 MPa) to about 3000 psig (20.7 MPa), a temperature of from about 500° F. (260° C.) to about 800° F. (427° C.), and a space velocity of from about 0.3 hr$^{-1}$ to about 5.0 hr$^{-1}$, and wherein the effective dewaxing conditions include temperatures of about 500° F. (260° C.) to about 750° F. (399° C.), pressures of about 400 psig (2.8 MPa) to about 800 psig (5.5 MPa), an LHSV of about 0.5 hr$^{-1}$ to about 5.0 hr$^{-1}$, and a space velocity of from about 0.3 hr$^{-1}$ to about 5.0 hr$^{-1}$.

Embodiment 7. A method according to any of the above embodiments, wherein the dewaxed heavy diesel fraction has a cloud point of about −30° C. or less.

Embodiment 8. A method according to any of the above embodiments, wherein at least one of the heavy diesel fraction corresponds to a bottoms fraction.

Embodiment 9. A method according to any of the above embodiments, wherein the light diesel fraction or the combined light diesel fraction corresponds to a jet fuel fraction.

Embodiment 10. A method according to any of the above embodiments, wherein the nitrogen content of the feedstock is at least about 500 wppm.

Embodiment 11. A method according to any of the above embodiments, wherein the sulfur content of the feedstock is at least about 100 wppm, the effective hydrotreating conditions being effective to reduce the sulfur content to about 15 wppm or less.

Embodiment 12. A method according to any of the above embodiments, wherein the at least a portion of hydrotreated feedstock is fractionated at a cut point of about 575° F. (302° C.) or less to form the heavy diesel fraction and the first light diesel fraction.

Embodiment 13. A method according to embodiment 1, further comprising combining at least a portion of the heavy diesel product and the light diesel fraction to form a combined diesel product, the combined diesel product having substantially the same cloud point as the heavy diesel product and the light diesel fraction.

What is claimed is:
1. A method for producing distillate products, comprising:
hydrotreating a feedstock under effective hydrotreating conditions;
passing at least a portion of the hydrotreated feedstock into a first separate volume of a divided wall fractionator;
fractionating the at least a portion of the hydrotreated feedstock at a cut point of at least about 260° C. to form a heavy diesel fraction and a first light diesel fraction, the heavy diesel fraction being withdrawn from the first separate volume of the divided wall fractionator;

dewaxing the heavy diesel fraction under effective dewaxing conditions to produce a dewaxed heavy diesel fraction having a cloud point of about −10° C. or less;

passing the dewaxed heavy diesel fraction into a second separate volume of the divided wall fractionator; and fractionating the dewaxed heavy diesel fraction to form at least a heavy diesel product withdrawn from the second separate volume, the fractionation further producing a second light diesel fraction, wherein the first light diesel fraction and the second light diesel fraction form a combined light diesel fraction that is withdrawn from a common volume of the divided wall fractionator.

2. The method of claim 1, wherein the effective hydrotreating conditions comprise a pressure of from about 300 psig (2.1 MPa) to about 3000 psig (20.7 MPa), a temperature of from about 500° F. (260° C.) to about 800° F. (427° C), and a space velocity of from about 0.3 $hr^{-1}$ to about 5.0 $hr^{-1}$.

3. The method of claim 1, wherein the effective dewaxing conditions include temperatures of about 500° F. (260° C.) to about 750° F. (399° C.), pressures of about 400 psig (2.8 MPa) to about 800 psig (5.5 MPa), an LHSV of about 0.5 $hr^{-1}$ to about 5.0 $hr^{-1}$, and a space velocity of from about 0.3 $hr^{-1}$ to about 5.0 $hr^{-1}$.

4. The method of claim 1, wherein the dewaxed heavy diesel fraction has substantially the same cloud point as the combined light diesel fraction.

5. The method of claim 1, wherein the light diesel fraction has a cloud point of about −30° C. or less and the dewaxed heavy diesel fraction has a cloud point of about −30° C. or less.

6. The method of claim 1, wherein at least one of the heavy diesel fraction and the heavy diesel product correspond to a bottoms fraction.

7. The method of claim 1, further comprising combining at least a portion of the combined light diesel fraction with the heavy diesel product to form a combined diesel product.

8. The method of claim 7, wherein the cloud point of the combined diesel product is +/−1° C. of the cloud point of the light diesel fraction.

9. The method of claim 1, wherein the combined light diesel fraction corresponds to a jet fuel fraction.

10. The method of claim', further comprising withdrawing a naphtha fraction from the common volume of the fractionator.

11. The method of claim 1, wherein the nitrogen content of the feedstock is at least about 500 wppm.

12. The method of claim 1, wherein the sulfur content of the feedstock is at least about 100 wppm, the effective hydrotreating conditions being effective to reduce the sulfur content to about 15 wppm or less.

13. The method of claim 1, wherein the at least a portion of hydrotreated feedstock is fractionated at a cut point of about 575° F. (302° C.) or less to form the heavy diesel fraction and the first light diesel fraction.

14. A method for producing distillate products, comprising:

hydrotreating a feedstock under effective hydrotreating conditions;

fractionating at least a portion of the hydrotreated feedstock at a cut point of at least about 260° C. to form a heavy diesel fraction and a light diesel fraction;

dewaxing the heavy diesel fraction under effective dewaxing conditions to produce a dewaxed heavy diesel fraction having a cloud point of about −10° C. or less;

fractionating the dewaxed heavy diesel fraction to form a dewaxed diesel product and at least one of a naphtha fraction or a light ends fraction; and combining at least a portion of the dewaxed diesel product and the light diesel fraction to form a combined diesel product, the combined diesel product having substantially the same cloud point as the dewaxed diesel product and the light diesel fraction.

15. The method of claim 14, wherein the combined diesel product has a cloud point of about −30° C. or less.

16. The method of claim 14, wherein forming a dewaxed diesel product comprises firming a light diesel product and a heavy diesel product, the cut point separating the light diesel product and the heavy diesel product being substantially the same as the cut point separating the light diesel fraction and the heavy diesel fraction.

17. The method of claim 14, wherein the nitrogen content of the feedstock is at least about 500 wpm.

18. The method of claim 14, wherein the sulfur content of the feedstock is at least about 50 wppm, the effective hydrotreating conditions being effective to reduce the sulfur content to about 15 wppm or less.

19. The method of claim 14, wherein the at least a portion of hydrotreated feedstock is fractionated at a cut point of about 575° F. (302° C.) or less to form the heavy diesel fraction and the first light diesel fraction.

20. The method of claim 14, wherein the heavy diesel fraction corresponds to a bottoms fraction.

\* \* \* \* \*